(12) United States Patent
Kwon et al.

(10) Patent No.: US 8,103,217 B2
(45) Date of Patent: Jan. 24, 2012

(54) APPARATUS AND METHOD FOR RADIO COMMUNICATION

(75) Inventors: Tae Soo Kwon, Hwaseong-si (KR); Hee Jung Yu, Daejeon-si (KR); Kyung Hun Jang, Suwon-si (KR); Young Chul Sung, Daejeon-si (KR); Hyo Sun Hwang, Seoul (KR); Yong Hoon Lee, Daejeon-si (KR); Young Seok Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 454 days.

(21) Appl. No.: 12/428,833

(22) Filed: Apr. 23, 2009

(65) Prior Publication Data

US 2009/0310548 A1    Dec. 17, 2009

(30) Foreign Application Priority Data

Jun. 11, 2008 (KR) .......................... 10-2008-0054714
Nov. 13, 2008 (KR) .......................... 10-2008-0112574

(51) Int. Cl.
*H04W 74/00* (2009.01)
(52) U.S. Cl. ..................................... 455/63.1
(58) Field of Classification Search .................... None
See application file for complete search history.

(56) References Cited

U.S. PATENT DOCUMENTS

| 7,869,400 | B2 * | 1/2011 | Hu et al. ................. 370/329 |
| 2007/0053410 | A1 | 3/2007 | Mahonen et al. |
| 2007/0248173 | A1 | 10/2007 | Hassan et al. |
| 2009/0124206 | A1 * | 5/2009 | Kwon et al. ............ 455/63.1 |
| 2009/0247201 | A1 * | 10/2009 | Ye et al. ................ 455/509 |
| 2010/0081387 | A1 * | 4/2010 | Shi et al. ............... 455/62 |

FOREIGN PATENT DOCUMENTS

| KR | 10-2007-0048576 | 5/2007 |
| KR | 10-2007-0051675 | 5/2007 |
| KR | 10-2007-0098285 | 10/2007 |
| KR | 10-0775979 | 11/2007 |

* cited by examiner

*Primary Examiner* — Lincoln Donovan
*Assistant Examiner* — Terry L Englund
(74) *Attorney, Agent, or Firm* — NSIP Law

(57) ABSTRACT

An apparatus and a method of performing radio communication are provided. The radio communication apparatus may determine a channel capacity of a radio channel based on a sensing duration to sense the radio channel and a false alarm probability, determine a sensing duration value and a false alarm probability value that maximize the channel capacity, and sense the radio channel based on the determined sensing duration value and the false alarm probability value.

15 Claims, 6 Drawing Sheets

APPARATUS AND METHOD FOR RADIO COMMUNICATION

CROSS-REFERENCE TO RELATED APPLICATIONS

This application claims the benefit under 35 U.S.C. §119 (a) of a Korean Patent Application No. 10-2008-0054714, filed on Jun. 11, 2008, and a Korean Patent Application No. 10-2008-0112574, filed on Nov. 13, 2008, in the Korean Intellectual Property Office, the entire disclosures of which are incorporated herein by reference.

BACKGROUND

1. Field

The following description relates to an apparatus and method for radio communication, and more particularly, to a radio communication apparatus and method that may effectively use frequency resources of a radio channel during a cognitive radio communication.

2. Description of Related Art

With the rapid development of wireless technologies, radio frequency resources are becoming scarce, and a good number of the radio frequency resources in a GHz band, particularly, in a relatively low frequency band have been allocated and are used. Accordingly, increasing attention is being paid to a cognitive radio communication system in which a frequency allocated to a primary user is used by a secondary user.

In a cognitive radio communication system, a primary user and a secondary user may communicate with each other using the same frequency band. In the cognitive radio communication system, the secondary user may transmit signals using an empty frequency band that is already allocated to the primary user but is substantially unused by the primary user. However, the primary user has priority with respect to an available frequency band. Accordingly, where a signal of the secondary user may collide with a signal of the primary user, the secondary user may need to suspend a data transmission or may need to change a usage frequency band to another frequency band.

Generally, as a sensing duration to perform sensing of a radio channel is longer, a detection performance of the radio channel may be enhanced. As the detection performance of the radio channel is enhanced, it may be possible to reduce an occurrence of an abnormal situation such as a false alarm, a detection error, and the like. On the other hand, an amount of resources that the secondary user may use to perform a data communication may decrease whereby an amount of data that the secondary user may transmit may also decrease. Accordingly, there is a need for a radio communication apparatus that may retrieve an optimal sensing duration and a false alarm probability in a given environment, and sense a radio channel using the optimal sensing duration and the false alarm probability so as to enhance a channel capacity of the radio channel.

SUMMARY

In one general aspect, a radio communication apparatus includes a channel capacity decision unit to determine a channel capacity of a radio channel based on a sensing duration for sensing the radio channel and a false alarm probability, a parameter decision unit to determine a sensing duration value and a false alarm probability value that maximize the channel capacity, and a sensing unit to sense the radio channel based on the sensing duration value and the false alarm probability value.

The apparatus may further include a system environment information collecting unit to collect system environment information associated with a primary user system and a secondary user system with respect to the radio channel, wherein the channel capacity decision unit determines the channel capacity of the radio channel by further considering the system environment information.

The system environment information may include at least one of a load amount of the primary user system, a load amount of the secondary user system, and a frequency interference amount in the radio channel.

Where a channel occupancy probability of a primary user with respect to the radio channel, corresponding to a primary activity factor, exists, the channel capacity decision unit may determine, as the channel capacity of the radio channel, a sum of a primary user channel capacity and a secondary user channel capacity with respect to the radio channel, and the primary user channel capacity and the secondary user channel capacity may be expressed by a function of the channel occupancy probability, the sensing duration, and the false alarm probability.

Where a channel occupancy probability of a primary user with respect to the radio channel, corresponding to a primary activity factor, does not exist, the channel capacity decision unit may determine, as the channel capacity of the radio channel, a smaller value between a primary user channel capacity and a secondary user channel capacity with respect to the radio channel, and the primary user channel capacity and the secondary user channel capacity may be expressed by a function of the sensing duration and the false alarm probability.

The channel capacity decision unit may determine, as the channel capacity of the radio channel, a secondary user channel capacity with respect to the radio channel, and the secondary user channel capacity may be expressed by a function of the sensing duration and the false alarm probability.

The parameter decision unit may calculate a first channel capacity value of the channel capacity based on a first sensing duration value and a first false alarm probability value, and may calculate a second channel capacity value of the channel capacity based on a second sensing duration value and a second false alarm probability value, and where a difference between the first channel capacity value and the second channel capacity value is less than a predetermined threshold value, the parameter decision unit may determine the second sensing duration value and the second false alarm probability value as the sensing duration value and the false alarm probability value, respectively.

The sensing unit may sense the radio channel using at least one of an energy detection scheme and a matched filter scheme.

The sensing unit may sense the radio channel based on a cost function with respect to at least one of a sensing signal-to-noise ratio (SNR), a throughput demand amount of a secondary user, a residual battery power of a radio communication apparatus of the secondary user, and a total battery power of the radio communication apparatus of the secondary user.

In another general aspect, a radio communication method includes determining a channel capacity of a radio channel based on a sensing duration for sensing the radio channel and a false alarm probability determining a sensing duration value and a false alarm probability value that maximize the channel capacity, and sensing the radio channel based on the sensing duration value and the false alarm probability value.

The method may further include collecting system environment information associated with a primary user system and a secondary user system with respect to the radio channel, wherein the determining comprises determining the channel capacity of the radio channel by further considering the system environment information.

The system environment information may include at least one of a load amount of the primary user system, a load amount of the secondary user system, and a frequency interference amount in the radio channel.

Where a channel occupancy probability of a primary user with respect to the radio channel, corresponding to a primary activity factor, exists, the determining may include determining, as the channel capacity of the radio channel, a sum of a primary user channel capacity and a secondary user channel capacity with respect to the radio channel, and the primary user channel capacity and the secondary user channel capacity may be expressed by a function of the channel occupancy probability, the sensing duration, and the false alarm probability.

Where a channel occupancy probability of a primary user with respect to the radio channel, corresponding to a primary activity factor, does not exist, the determining may include determining, as the channel capacity of the radio channel, a smaller value between a primary user channel capacity and a secondary user channel capacity with respect to the radio channel, and the primary user channel capacity and the secondary user channel capacity may be expressed by a function of the sensing duration and the false alarm probability.

The determining may include determining, as the channel capacity of the radio channel, a secondary user channel capacity with respect to the radio channel, and the secondary user channel capacity may be expressed by a function of the sensing duration and the false alarm probability.

Other features and aspects will become apparent from the following detailed description, the drawings, and the claims.

Figure 1:
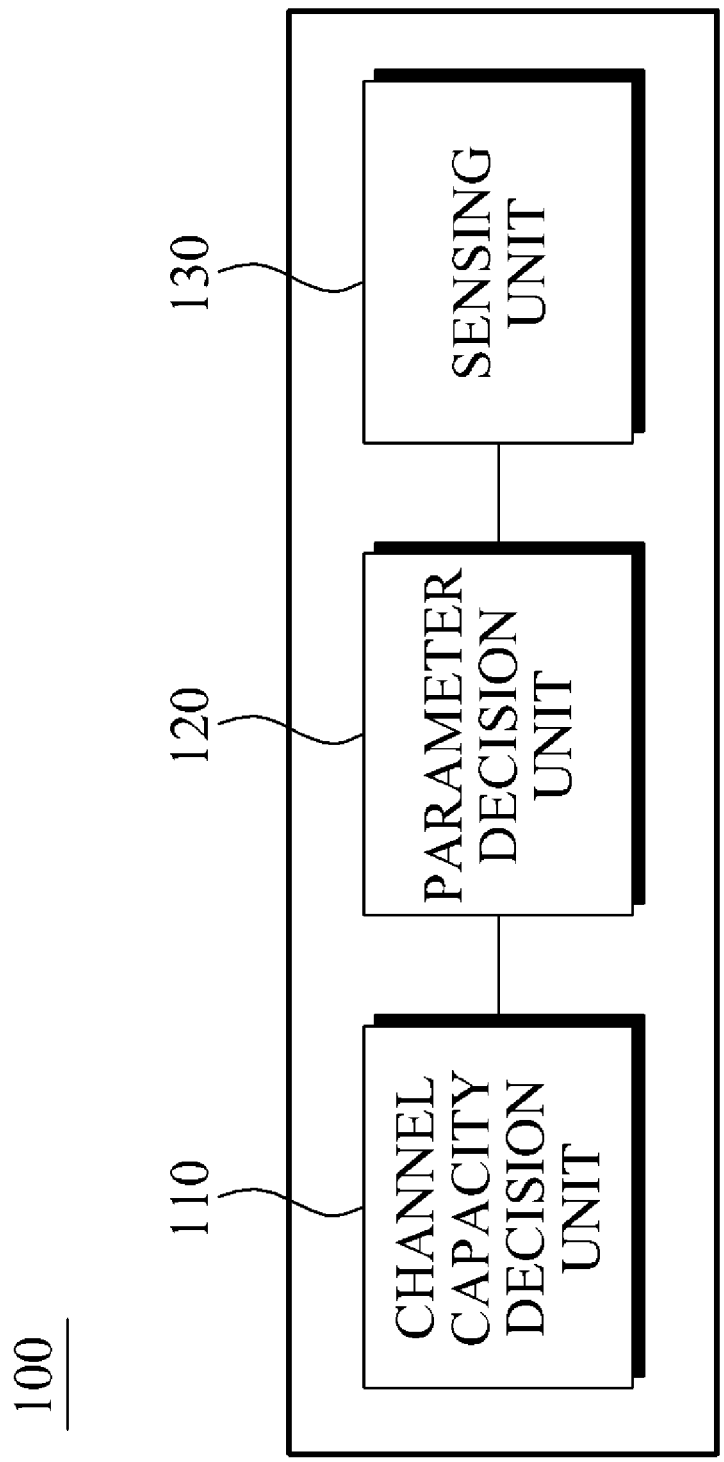
FIG. 1 is a block diagram illustrating a configuration of an exemplary radio communication apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates a configuration of an exemplary radio communication apparatus 100.

The radio communication apparatus 100 includes a channel capacity decision unit 110, a parameter decision unit 120, and a sensing unit 130.

The channel capacity decision unit 110 may determine a channel capacity of a radio channel based on a sensing duration in order to sense the radio channel and a false alarm probability.

The sensing duration refers to a period of time that is used to determine whether a primary user is using a radio channel that a secondary user desires to use. The false alarm probability refers to a probability that the radio channel is not actually being used by the primary user, but may be mistakenly thought to be used by the primary user. The false alarm probability may be related to a detection error probability. The detection error probability refers to a probability that the radio channel is being used by the primary user, but may be mistakenly thought to not be used by the primary user. Where a sensing threshold increases to detect a signal in the radio channel, the false alarm probability may decrease whereas the detection error probability may increase. Since the detection error probability is in inverse proportion to a detection probability to allow a signal to be detected in the radio channel, the false alarm probability may be proportional to the detection probability. A result of the false alarm probability, a result of the detection probability, or a result of the detection error probability may also be referred to as a result of a sensing operating point.

A probability that the radio channel may be used by the primary user may be referred to as a channel occupancy probability. Where the channel occupancy probability exists, the channel capacity decision unit 110 may determine, as the channel capacity of the radio channel, a sum of a primary user channel capacity and a secondary user channel capacity with respect to the radio channel. The primary user channel capacity and the secondary user channel capacity may be expressed by a function of the channel occupancy probability, the sensing duration, and the false alarm probability.

The channel occupancy also may correspond to a primary activity factor. The primary activity factor may be defined as a probability ($\gamma_P \in [0, 1]$) that a primary transmitter sends a packet including a training signal and data to a receiver independently.

Where the channel occupancy probability exists, it may be possible to be aware of a probability that the radio channel may be used by the primary user and a probability that the radio channel may be used by the secondary user. Accordingly, a total channel capacity of the radio channel may be predicted using the channel occupancy probability. For example, since the total channel capacity where a single radio channel is used by the primary user and the secondary user may be directly predicted using the channel occupancy probability, the channel capacity decision unit 110 may determine, as the channel capacity of the radio channel, a sum of the primary user channel capacity and the secondary user channel capacity.

In this instance, the primary user channel capacity may correspond to a value that may be obtained by multiplying a primary user channel capacity where the primary user exclusively uses the radio channel, the channel occupancy probability, and the detection probability. The secondary user channel capacity may correspond to a value that may be obtained by multiplying a secondary user channel capacity value where the secondary user exclusively uses the radio channel, a probability that the primary user may not use the radio channel, a probability that a false alarm may not occur, and a time ratio that the secondary user may transmit a packet.

For example, where the channel occupancy probability exists, the channel capacity may be expressed by the following Equation 1:

$$C = \gamma \beta(\alpha, T_s)C_p + (1-\gamma)(1-\alpha)\frac{T_{sec} - T_s}{T_{sec}}C_s, \quad \text{[Equation 1]}$$

where C denotes the channel capacity, $\gamma\beta(\alpha, T_s)C_p$ denotes the primary user channel capacity, $$(1-\gamma)(1-\alpha)\frac{T_{sec} - T_s}{T_{sec}}C_s$$

denotes the secondary user channel capacity, $T_S$ denotes the sensing duration, $\alpha$ denotes the false alarm probability, $\gamma$ denotes the channel occupancy probability, $\beta(\alpha, T_S)$ denotes the detection probability using $\alpha$ and $T_S$ as parameters, $C_p$ denotes the primary user channel capacity where the primary user exclusively uses the radio channel, $C_s$ denotes the secondary user channel capacity where the secondary user exclusively uses the radio channel, $T_{sec}$ denotes a slot time of the secondary user.

The detection probability may have a different value corresponding to each channel detection scheme. For example, the channel detection scheme may include an energy detection scheme, a matched filtering scheme, etc. The detection probability according to the energy detection scheme and the detection probability according to the matched filtering scheme may be determined according to the following Equation 2 and Equation 3, respectively:

$$\beta(\alpha, T_s) = Q\left(Q^{-1}(\alpha) = \sqrt{\frac{T_s}{2}} SNR_{sense}\right), \text{ and} \quad \text{[Equation 2]}$$

$$\beta(\alpha, T_s) = Q(Q^{-1}(\alpha) - \sqrt{T_s SNR_{sense}}), \quad \text{[Equation 3]}$$

$$\text{where } Q(x) = \int_{-\infty}^{K} \frac{1}{\sqrt{2\pi}} e^{-0.5t^2} dt$$

and $SNR_{sense}$ denotes a sensing signal-to-noise ratio (SNR).

According to an exemplary embodiment, where the channel occupancy probability of the primary user with respect to the radio channel, corresponding to the primary activity factor, does not exist, the channel capacity decision unit 110 may determine, as the channel capacity of the radio channel, a smaller value between the primary user channel capacity and the secondary user channel capacity with respect to the radio channel. The primary user channel capacity and the secondary user channel capacity may be expressed by a function of the sensing duration and the false alarm probability.

Generally, the channel occupancy probability of the primary user with respect to the radio channel may be unknown. In this case, since it may be difficult to be aware of an operating characteristic of the primary user, it may be also be difficult to be aware of a probability that the radio channel may be used by the primary user and a probability that the radio channel may be used by the secondary user. Accordingly, a total channel capacity may not be predicted. Where the channel occupancy probability does not exist, it is possible to use a maxim scheme that obtains a smaller value between a capacity of the primary user and a capacity of the secondary user with respect to the radio channel, and to maximize the smaller value. For example, the channel capacity decision unit 110 may determine, as the channel capacity of the radio channel, the smaller value between the primary user channel capacity and the secondary user channel capacity.

In this instance, the primary user channel capacity may correspond to a value that may be obtained by multiplying a primary user channel capacity where the primary user exclusively uses the radio channel and the detection probability. The secondary user channel capacity may correspond to a value that may be obtained by multiplying a secondary user channel capacity value where the secondary user exclusively uses the radio channel, a probability that a false alarm may not occur and a time ratio that the secondary user may transmit a packet. For example, where the channel occupancy probability does not exist, the channel capacity may be expressed by the following Equation 4:

$$C = \min\left(\beta(\alpha, T_S)C_p, (1-\alpha)\frac{T_{sec} - T_s}{T_{sec}}C_s\right), \quad \text{[Equation 4]}$$

where C denotes the channel capacity, $\beta(\alpha, T_S)C_p$ denotes the primary user channel capacity, and $$(1-\alpha)\frac{T_{sec} - T_s}{T_{sec}}C_s$$

denotes the secondary user channel capacity.

Where an importance of any one user between the primary user and the secondary user is greater, a weight value may be assigned according to the importance. In this instance, the channel capacity may be expressed by the following Equation 5:

$$C = \min\left(\mu\beta(\alpha, T_S)C_p, (1-\mu)(1-\alpha)\frac{T_{sec} - T_s}{T_{sec}}C_s\right), \quad \text{[Equation 5]}$$

where $\mu$ denotes the weight according to the importance.

According to an exemplary embodiment, the channel capacity decision unit 110 may determine, as the channel capacity of the radio channel, a secondary user channel capacity with respect to the radio channel. The secondary user channel capacity may be expressed by a function of the sensing duration and the false alarm probability.

According to a cognitive radio communication system defined by an Institute of Electrical and Electronics Engineers (IEEE) 802.22 standard, in a worst-case scenario, a sensing SNR may need to be −22 dB, the false alarm probability in the sensing SNR may need to be less than or equal to 10%, and the detection probability may need to be greater than or equal to 90%. Due to the above requirements, the cognitive radio communication system defined in the IEEE 802.22 standard may maximize the secondary user channel capacity to thereby maximize the channel capacity of the radio channel without affecting interference against the primary user.

In this case, the secondary user channel capacity may correspond to a value that may be obtained by multiplying a secondary user channel capacity where the secondary user exclusively uses the radio channel, a probability that a false alarm may not occur and a time ratio that the secondary user may transmit a packet. For example, in the cognitive radio communication system according to the IEEE 802.22 standard, the channel capacity may be expressed by the following Equation 6:

$$C = (1-\alpha)\frac{T_{sec}-T_s}{T_{sec}}C_s \text{ s.t. } \beta(\alpha, T_s) \geq PD, \alpha \leq PF \quad \text{[Equation 6]}$$

where PD denotes a minimum detection probability in the cognitive radio communication system according to the IEEE 802.22 standard, PF denotes a maximum false alarm probability in the cognitive radio communication system according to the IEEE 802.22 standard, and PD is 0.9, and PF is 0.1.

The parameter decision unit 120 may determine a sensing duration value and a false alarm probability value that maximize the channel capacity.

In order to effectively use frequency resources of the radio channel, the determined channel capacity may need to be maximized according to various types of environments. The channel capacity may be expressed by the function of the sensing duration and the false alarm probability. Accordingly, the parameter decision unit 120 may determine the sensing duration value and the false alarm probability value so that the channel capacity to be changed according to the sensing duration and the false alarm probability may have a maximum value.

According to an exemplary embodiment, the parameter decision unit 120 may calculate a first channel capacity value of the channel capacity based on a first sensing duration value and a first false alarm probability value, and may calculate a second channel capacity value of the channel capacity based on a second sensing duration value and a second false alarm probability value. Where a difference between the first channel capacity value and the second channel capacity value is less than a predetermined threshold value, the parameter decision unit 120 may determine the second sensing duration value and the second false alarm probability value as the sensing duration value and the false alarm probability value, respectively.

According to an exemplary embodiment, the parameter decision unit 120 may calculate the sensing duration value and the false alarm probability value that each maximize the channel capacity, according to the following process.

Initially, the parameter decision unit 120 may set the first sensing duration value corresponding to an initial sensing duration value and the first false alarm probability value corresponding to an initial false alarm probability value. Assuming a worst-case scenario regarding sensing of the radio channel, the parameter decision unit 120 may calculate the first channel capacity value by using a largest sensing duration value as the first sensing duration value and by using a largest false alarm probability value as the first false alarm probability value.

The parameter decision unit 120 may calculate the first channel capacity value using the first sensing duration value and the first false alarm probability value.

Where the first sensing duration value is determined as the sensing duration, the parameter decision unit 120 may calculate the second false alarm probability value. Where the second false alarm probability value is calculated, the parameter decision unit 120 may determine the second false alarm probability value as the false alarm probability and then calculate the second sensing duration value.

The parameter decision unit 120 may calculate the second channel capacity value using the second sensing duration value and the second false alarm probability value. Where a difference between the first channel capacity value and the second channel capacity value is less than a predetermined threshold value, the parameter decision unit 120 may determine the second sensing duration value and the second false alarm probability value as the sensing duration value and the false alarm probability value that maximize the channel capacity.

Here, a process of determining another factor in a state where a single factor is determined may be performed using a simplified gradient scheme. The process may be performed by calculating a gradient of each of the factors with respect to the channel capacity.

The sensing unit 130 may sense the radio channel using at least one of an energy detection scheme and a matched filter scheme.

The energy detection scheme may determine whether a signal exists based on a signal strength of a corresponding frequency. The energy detection scheme may be a relatively simple detection scheme that may be used where a particular pattern does not exist in a signal of the primary user. However, in this instance, a problem may occur, such as a method of how to set the signal strength. Since a countermeasure corresponding to an interference signal is provided, signals may not be accurately detected. In addition, the energy detection scheme may be vulnerable to a transmission scheme that uses a spreading scheme.

The matched filter scheme may sense a channel using the pattern found in the signal of the primary user and may accurately detect signals. The matched filter scheme may maximize a sensing SNR, but may have a difficult in detecting signals in various types of environments since the matched filter scheme may need to be aware of information associated with the signal of the primary user.

The sensing unit 130 may sense the radio channel using either the energy detection scheme or the matched filter scheme, and may also sense the radio channel using both the energy detection scheme and the matched filtering scheme. Where both the energy detection scheme and the matched filtering scheme are used, a detection performance of the radio channel may be enhanced whereas the sensing duration may be prolonged.

According to an exemplary embodiment, the sensing unit 130 may sense the radio channel based on a cost function with respect to at least one of a sensing SNR, a throughput demand amount of the secondary user, a residual battery power of a radio communication apparatus of the secondary user, and a total battery power of the radio communication apparatus of the secondary user.

Where the sensing SNR is high, the throughput demand amount of the primary user is small, and the residual battery power of the radio communication apparatus of the secondary user whereby it is required to decrease a power consumption, the radio channel may be sensed using the simple energy detection scheme. In a converse case, the radio channel may be sensed using the matched filtering scheme. Accordingly, the sensing unit 130 may determine a cost function value with respect to at least one of the sensing SNR, the throughput demand amount of the secondary user, the residual battery power of the radio communication apparatus of the secondary user, and the total battery power of the radio communication apparatus of the secondary user. The sensing unit 130 may perform a channel detection by selecting a channel detection scheme according to the cost function value. For example, the cost function to determine the channel detection scheme may be expressed by the following Equation 7:

$$\text{Cost} = a(\text{sensing\_SNR}) + b\left(\frac{1}{\text{throughput\_demand}}\right) +$$
$$c\left(1 - \frac{\text{residual\_battery\_power}}{\text{total\_battery\_power}}\right),$$ [Equation 7]

where Cost denotes the cost function, sensing_SNR denotes the sensing SNR, throughput_demand denotes the throughput demand amount of the secondary user, residual_battery_power denotes the residual battery power of the radio communication apparatus of the secondary user, total_battery_power denotes the total battery power of the radio communication apparatus of the secondary user, and each of a, b, and c denotes a weight, and the weight may be set to a different value according to a radio communication environment.

For example, the sensing unit 130 may compare the cost function value with a predetermined threshold. Where the cost function value is greater than or equal to the predetermined threshold, the sensing unit 130 may sense the radio channel using the energy detection scheme. Where the cost function value is less than the predetermined threshold, the sensing unit 130 may sense the radio channel using the matched filtering scheme.

As described above, according to an exemplary embodiment, the channel capacity decision unit 110 may determine the channel capacity in various types of radio communication environments. The parameter decision unit 120 may determine the sensing duration value and the false alarm probability value that maximize the channel capacity. The sensing unit 130 may sense the radio channel based on the determined sensing duration value and the false alarm probability value to thereby determine whether to transmit signals. Accordingly, the radio communication apparatus 100 may more effectively use the radio channel.

Figure 2:
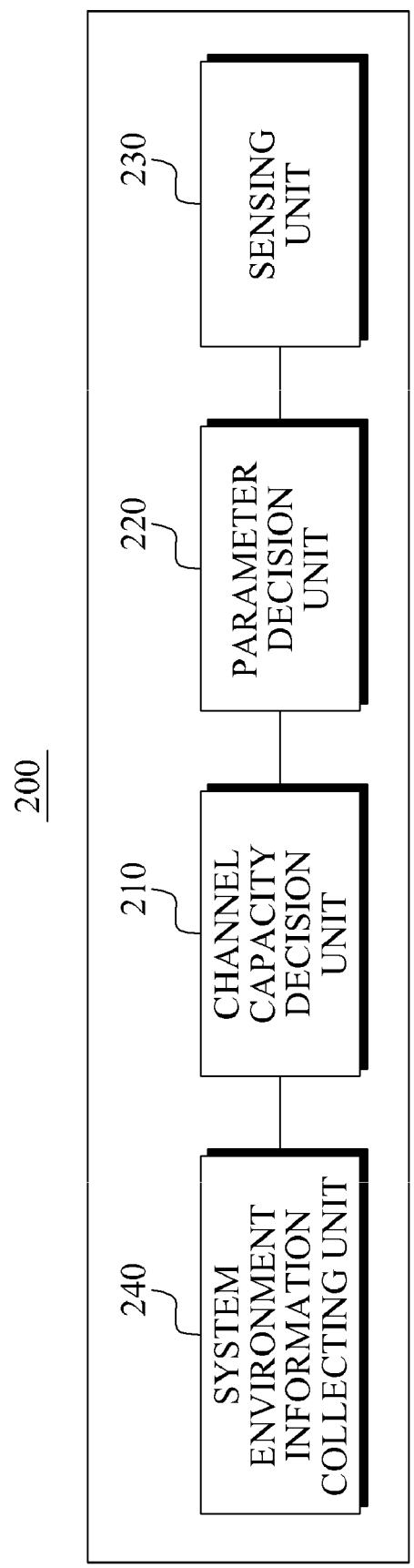
FIG. 2 is a block diagram illustrating a configuration of another exemplary radio communication apparatus.

FIG. 2 illustrates a configuration of another exemplary radio communication apparatus 200.

The radio communication apparatus 200 includes a channel capacity decision unit 210, a parameter decision unit 220, a sensing unit 230, and a system environment information collecting unit 240.

The system environment information collecting unit 240 may collect system environment information associated with a primary user system and a secondary user system with respect to the radio channel.

A radio communication apparatus to perform a cognitive radio communication may perform a radio communication in various types of communication environments. Accordingly, prior to determining the channel capacity, the system environment information collecting unit 210 may collect the system environment information associated with the primary user system and the secondary user system with respect to the radio channel.

According to an exemplary embodiment, the system environment information may include at least one of a load amount of the primary user system, a load amount of the secondary user system, and a frequency interference amount in the radio channel.

For example, where the load amount of the primary user system is large and the load amount of the secondary user system is small, the radio communication system 200 may maintain current priorities of the primary user and the secondary user. Where the load amount of the primary user system is small and the load amount of the secondary user system is large, the radio communication system 200 may change the priorities of the primary user system and the secondary user system.

According to an exemplary embodiment, the radio communication apparatus 200 may adaptively change a channel detection scheme and a parameter setting based on a system environment of the primary user system and a system environment of the secondary user system, to perform a channel detection.

The channel capacity decision unit 210 may determine the channel capacity of the radio channel based on the sensing duration to perform sensing of the radio channel, the false alarm probability, and the collected system environment information.

The parameter decision unit 220 may determine a sensing duration value and a false alarm probability value that maximize the channel capacity. The sensing unit 230 may sense the radio channel based on the determined sensing duration value and the false alarm probability value.

Hereinafter, an operation of the radio communication apparatus 200 including the system environment information collecting unit 240 will be described using various exemplary embodiments.

For example, the primary user system may include a master base station device and a mobile terminal. The secondary user system may include a femtocell base station device and a mobile terminal.

The femtocell base station device denotes a miniature base station device corresponding to a mobile communication. The femtocell base station device may play a similar role to a wireless local area network (WLAN) relay, but may function as a relay to connect a mobile phone, instead of an Internet access. The master base station device denotes all the types of wired/wireless communication devices that may control the femtocell base station device. For example, the master base station device may be a macrocell base station device, a microcell base station device, a picocell base station device, and the like.

Where the master base station device and the femtocell base station device communicate with mobile phones, respectively, using the same frequency band, a user of a primary mobile terminal to communicate with the master base station device may become a primary user. A user of a secondary mobile terminal to communicate with the femtocell base station device may become a secondary user.

However, where a load amount of the secondary user system is as large as a load amount of the primary user, a priority of the primary user and a priority of the secondary user may be set to be the identical, in order to maximize a usage efficiency of the radio channel.

For example, since mobile terminal users are generally performing activities outside home during a day time, a number of users of primary mobile terminals may be greater than a number of users of secondary mobile terminals. Accordingly, the users of the primary mobile terminals may become the primary users.

Conversely, since many mobile terminal users stay at home during a night time, the number of users of primary mobile terminals may be similar to the number of users of secondary mobile terminals. For example, the load amount of the secondary user system may increase. In this case, where the priority of the primary mobile terminal and the priority of the secondary mobile terminal are set to be identical, the radio channel may be more effectively used.

Accordingly, during day time, the users of the secondary mobile terminals may communicate with the femtocell base station device as the secondary users. During night time, the users of the secondary mobile terminals may communicate with the femtocell base station device, having the same priority as the priority of the primary users.

As another example, the primary user system may include a primary femtocell base station device and a primary mobile terminal that are installed at a communication provider side. The secondary user system may include a secondary femtocell base station device and a secondary mobile terminal that are installed at a user side.

A user of the primary mobile terminal that communicates with the primary femtocell base station device may be a paid user of a corresponding frequency and thus may use the radio channel with a higher priority than a user of the secondary mobile terminal.

However, as described above, where the load amount of the secondary user system is large, or where a frequency interference amount is large, the user priority may be adjusted to effectively use the radio channel.

As still another example, each of the primary user system and the secondary user system may include a WLAN system and a femtocell base station device.

In order to secure a radio channel usage right of the primary user, the channel capacity decision unit 210 may determine the channel capacity of the radio channel according to the above Equation 1.

Where it is required to set the radio channel usage right of the primary user and a radio channel usage right of the secondary user to be identical, the channel capacity decision unit 210 may determine the channel capacity of the radio channel according to any one of the above Equation 4 and Equation 5.

Where the channel capacity of the radio channel is determined according to the above Equation 4, the primary user and the secondary user may have the equivalent usage right to the radio channel. For example, the equivalent co-primary user relationship may be established between the primary user and the secondary user.

Where the channel capacity of the radio channel is determined according to the above Equation 5, a weighted co-primary user relationship may be established between the primary user and the secondary user.

Figure 3:
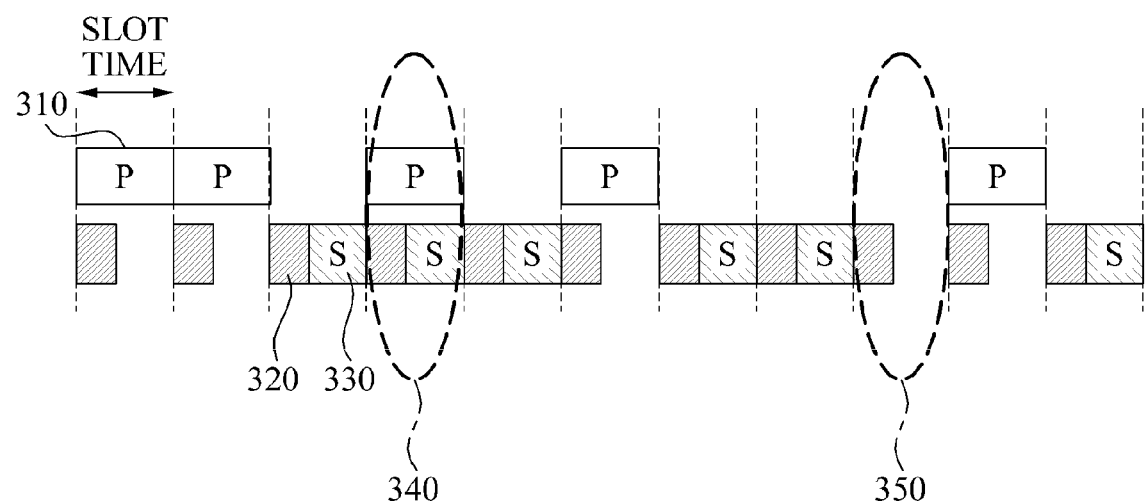
FIGS. 3 through 5 are diagrams illustrating an exemplary operation of sensing a radio channel.
Figure 4:
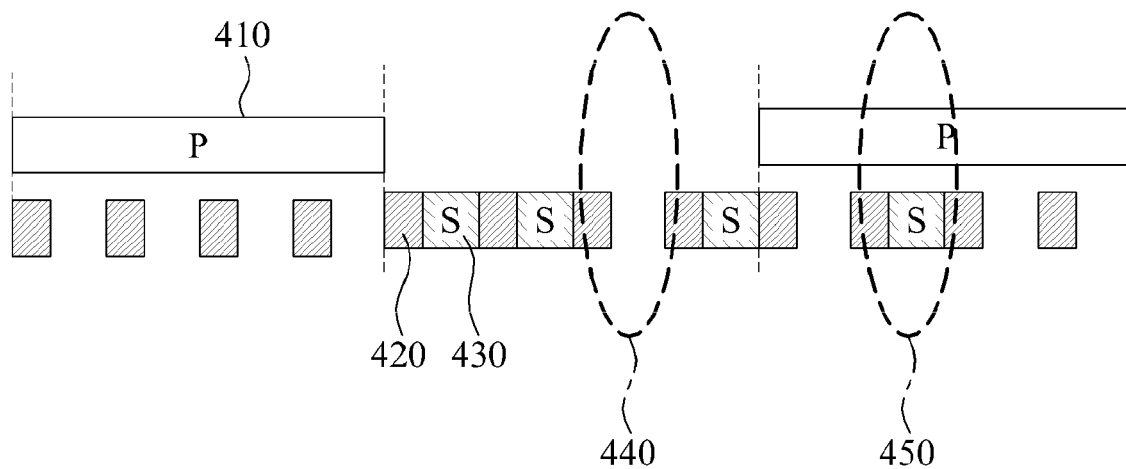
Figure 5:
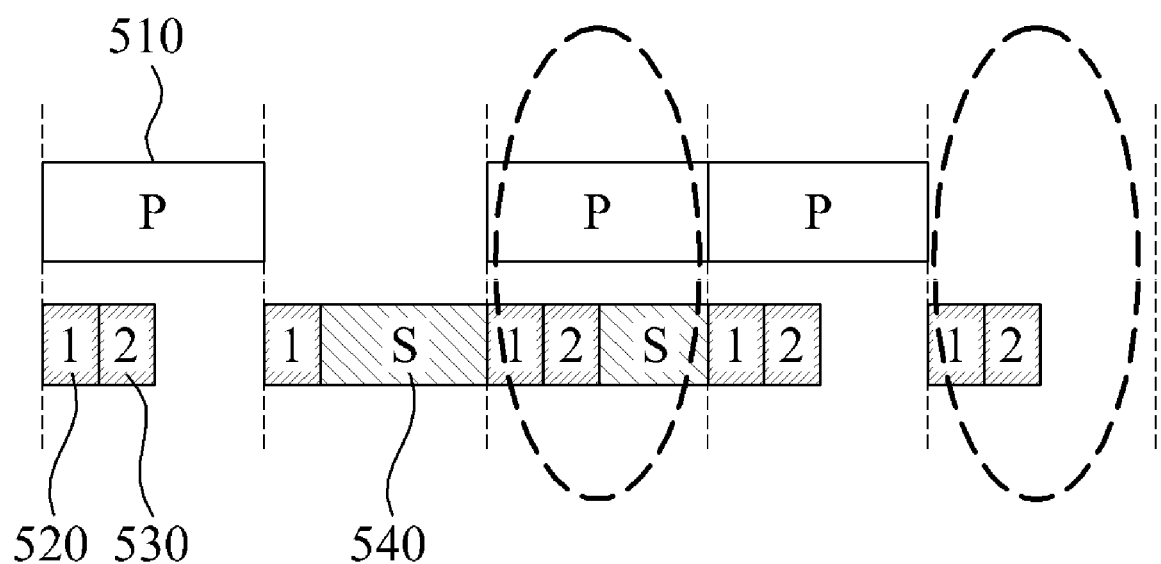

FIGS. 3 through 5 illustrate an exemplary operation of sensing a radio channel.

FIG. 3 illustrates a slot time of a primary user which is identical to a slot time of a secondary user and a radio channel which is sensed using a single detection scheme. The primary user may transmit a primary user packet 310 via the radio channel. In a sensing duration 320, the secondary user may determine whether the primary user packet 310 is being transmitted via the radio channel. Where the primary user packet 310 is not transmitted via the radio channel, the secondary user may transmit a secondary user packet 330 via the radio channel. Referring to FIG. 3, a detection error 340 has occurred and a false alarm 350 has occurred. In this instance, the sensing duration 320 and a false alarm probability may be determined by the parameter decision unit 120 of FIG. 1. The radio channel may be sensed by the sensing unit 130 of FIG. 1, based on the sensing duration 320 and the false alarm probability.

FIG. 4 illustrates a slot time of a primary user which is different from a slot time of a secondary user and a radio channel which is sensing using a single detection scheme. In FIG. 4, for example, the slot time of the primary user is four times greater than the slot time of the secondary user.

Where the slot time of the primary user is N times greater than the slot time of the secondary user and the primary user transmits a primary user packet 410 of a one time, the secondary user may perform a channel detection N times in a sensing duration 420 to thereby transmit a secondary user packet 430. Where a detection error 440 or a false alarm 450 occurs even at least once among N-time channel detections, the channel capacity of the radio channel may be determined to be zero.

As described above, where the slot time of the primary user is N times greater than the slot time of the secondary user and a channel occupancy probability exists, the channel capacity of the radio channel may be expressed by the following Equation 8:

$$C = \gamma(\beta(\alpha, T_s))^N C_p + (1-\gamma)(1-\alpha)\frac{T_{sec} - T_s}{T_{sec}} C_s. \quad \text{[Equation 8]}$$

FIG. 5 illustrates a slot time of a primary user which is identical to a slot time of a secondary time and a radio channel which is sensed using two detection schemes.

The sensing unit 130 of FIG. 1 may sense the radio channel using two detection schemes together. For example, the sensing unit 130 may initially perform a channel detection using an energy detection scheme and subsequently more accurately perform the channel detection using a matched filter scheme. As described above, the energy detection scheme may be readily embodied but may have a relatively low detection performance. FIG. 5 illustrates a first sensing duration 520 by the energy detection scheme and a second sensing duration 530 by the matched filter scheme.

It may be determined whether a primary user packet 510 is transmitted via the radio channel, using the radio detection scheme. Where it is determined the primary user packet 510 is not transmitted via the radio channel, a secondary user may transmit a secondary user packet 540 via the radio channel. Where it is determined the primary user packet 510 is transmitted via the radio channel, the channel detection may be performed again using the matched filter scheme. Where it is determined again the primary user packet 510 is transmitted via the radio channel even using the matched filter scheme, the secondary user may not transmit the secondary user packet 540. Accordingly, the channel capacity of the radio channel may be expressed by the following Equation 9:

$$C = \gamma(\beta_1(\alpha_1, T_{s1}))(\beta_2(\alpha_2, T_{s2}))C_p + \quad \text{[Equation 9]}$$
$$(1-\gamma)(1-\alpha_1)\frac{T_{sec} - T_{s1}}{T_{sec}} + \alpha_1(1-\alpha_2)\frac{T_{sec} - T_{s1} - T_{s2}}{T_{sec}} C_s,$$

where $\beta_1(\alpha_1, T_{s^1})$ denotes a detection probability in the initial detection operation, $\alpha_1$ denotes a false alarm probability in the initial detection operation, $T_{s^1}$ denotes a sensing duration in the initial detection operation, $\beta_2(\alpha_2, T_{s^2})$ denotes a detection probability in the subsequent detection operation, $\alpha_2$ denotes a false alarm probability in the subsequent detection operation, and $T_{s^2}$ denotes a sensing duration in the subsequent sensing duration.

Even where the radio channel is sensed using both the energy detection scheme and the matched filter scheme, the slot time of the primary user may be N times greater than the slot time of the secondary user. In this case, the channel capacity of the radio channel may be expressed by the following Equation 10:

$$C = \gamma(\beta_1(\alpha_1, T_{s1}))^N (\beta_2(\alpha_2, T_{s2}))^N C_p + \quad \text{[Equation 10]}$$
$$(1-\gamma)(1-\alpha_1)\frac{T_{sec} - T_{s1}}{T_{sec}} + \alpha_1(1-\alpha_2)\frac{T_{sec} - T_{s1} - T_{s2}}{T_{sec}}.$$

Figure 6:
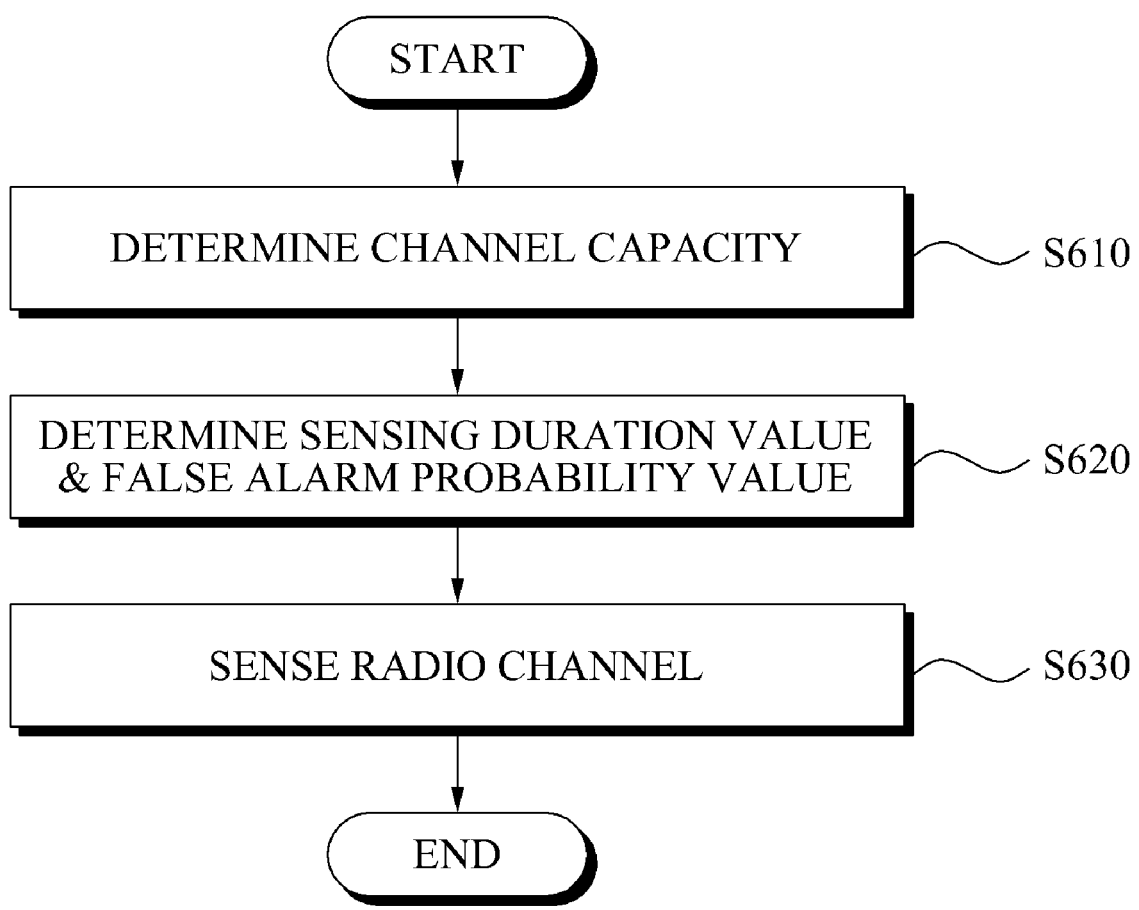
FIG. 6 is a flowchart illustrating an exemplary radio communication method.
Figure 7:
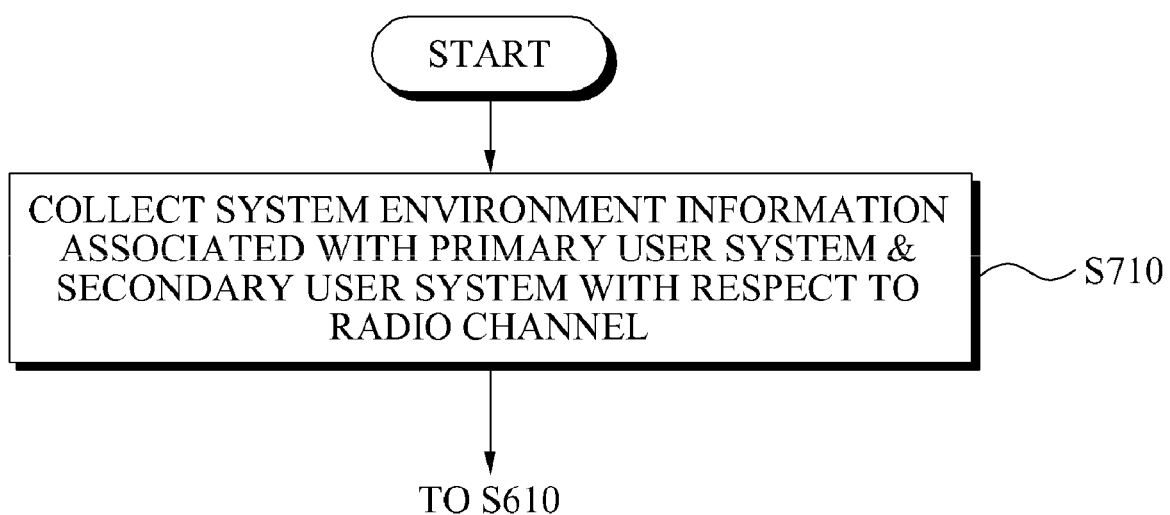
FIG. 7 is a flowchart illustrating another exemplary radio communication method.

FIG. 6 is a flowchart illustrating an exemplary radio communication method, and FIG. 7 is a flowchart illustrating another exemplary radio communication method. Hereinafter, the radio communication method will be described in detail with reference to FIGS. 6 and 7.

In operation S610, the radio communication method may determine a channel capacity of a radio channel based on a sensing duration corresponding to sensing the radio channel and a false alarm probability.

Referring to FIG. 7, the radio communication method may further include operation S710.

In operation S710, the radio communication method may collect system environment information associated with a primary user system and a secondary user system with respect to the radio channel.

A radio communication apparatus to perform a cognitive radio communication may perform a radio communication in various types of communication environments. In operation S710, prior to determining the channel capacity, the radio communication method may collect the system environment information associated with the primary user system and the secondary user system with respect to the radio channel.

In this case, the radio communication method may determine the channel capacity of the radio channel based on the sensing duration to sense the radio channel, the false alarm probability, and the collected system environment information in operation S610.

For example, operation S710 may be included to collect the system environment information in order to effectively use the radio channel.

According to an exemplary embodiment, the system environment information may include at least one of a load amount of the primary user system, a load amount of the secondary user system, and a frequency interference amount in the radio channel.

Also, according to an exemplary embodiment, where a channel occupancy probability of a primary user with respect to the radio channel, corresponding to a primary activity factor, exists, the radio communication method may determine, as the channel capacity of the radio channel, a sum of a primary user channel capacity and a secondary user channel capacity with respect to the radio channel in operation S610. The primary user channel capacity and the secondary user channel capacity may be expressed by a function of the channel occupancy probability, the sensing duration, and the false alarm probability.

Where the channel occupancy probability exists, it may be possible to be aware of a probability that the radio channel may be used by the primary user and a probability that the radio channel may be used by the secondary user. Accordingly, a total channel capacity of the radio channel may be predicted using the channel occupancy probability. For example, since the total channel capacity where a single radio channel is used by the primary user and the secondary user may be directly predicted using the channel occupancy probability, the radio communication method may determine, as the channel capacity of the radio channel, the sum of the primary user channel capacity and the secondary user channel capacity in operation S610.

In this instance, the primary user channel capacity may correspond to a value that may be obtained by multiplying a primary user channel capacity value where the primary user exclusively uses the radio channel, the channel occupancy probability, and the detection probability. The secondary user channel capacity may correspond to a value that may be obtained by multiplying a secondary user channel capacity value where the secondary user exclusively uses the radio channel, a probability that the primary user may not use the radio channel, a probability that a false alarm may not occur, and a time ratio that the secondary user may transmit a packet. For example, where the channel occupancy probability exists, the channel capacity may be expressed by the above Equation 1.

The detection probability may have a different value corresponding to each channel detection scheme. For example, the channel detection scheme may include an energy detection scheme, a matched filtering scheme, and the like. The detection probability according to the energy detection scheme and the detection probability according to the matched filtering scheme may be determined, respectively, according to the above Equation 2 and Equation 3.

According to an exemplary embodiment, where a channel occupancy probability of a primary user with respect to the radio channel, corresponding to a primary activity factor, does not exist, the radio communication method may determine, as the channel capacity of the radio channel, a smaller value between a primary user channel capacity and a secondary user channel capacity with respect to the radio channel in operation S610. The primary user channel capacity and the secondary user channel capacity may be expressed by a function of the sensing duration and the false alarm probability.

Generally, the channel occupancy probability of the primary user with respect to the radio channel may be unknown. In this case, since it may be difficult to be aware of an operating characteristic of the primary user, it may be difficult to be aware of a probability that the radio channel may be used by the primary user and a probability that the radio channel may be used by the secondary user. Accordingly, a total channel capacity may not be predicted. Where the channel occupancy probability does not exist, the radio communication method may use a maxim scheme that obtains the smaller value between a capacity of the primary user and a capacity of the secondary user with respect to the radio channel, and to maximize the smaller value. For example, the radio communication method may determine, as the channel capacity of the radio channel, the smaller value between the primary user channel capacity and the secondary user channel capacity in operation S610.

In this instance, the primary user channel capacity may correspond to a value that may be obtained by multiplying a primary user channel capacity where the primary user exclusively uses the radio channel and the detection probability. The secondary user channel capacity may correspond to a value that may be obtained by multiplying a secondary user channel capacity value where the secondary user exclusively uses the radio channel, a probability that a false alarm may not occur, and a time ratio that the secondary user may transmit a packet. For example, where the channel occupancy probability does not exist, the channel capacity may be expressed by the above Equation 4.

Where an importance of any one user between the primary user and the secondary user is greater, a weight value may be assigned according to the importance. In this instance, the channel capacity may be expressed by the above Equation 5.

According to an exemplary embodiment, the radio communication method may determine, as the channel capacity of the radio channel, a secondary user channel capacity with respect to the radio channel in operation S610. The secondary user channel capacity may be expressed by a function of the sensing duration and the false alarm probability.

According to a cognitive radio communication system defined by an IEEE 802.22 standard, in a worst situation, a sensing SNR may need to be −22 dB, the false alarm probability in the sensing SNR may need to be less than or equal to 10%, and the detection probability may need to be greater than or equal to 90%. Due to the above requirements, the cognitive radio communication system defined in the IEEE 802.22 standard may maximize the secondary user channel capacity to thereby maximize the channel capacity of the radio channel without affecting interference against the primary user.

In this case, the secondary user channel capacity may correspond to a value that may be obtained by multiplying a secondary user channel capacity where the secondary user exclusively uses the radio channel, a probability that a false alarm may not occur and a time ratio that the secondary user may transmit a packet. For example, in the cognitive radio communication system according to the IEEE 802.22 standard, the channel capacity may be expressed by the above Equation 6.

In operation S620, the radio communication method may determine a sensing duration value and a false alarm probability value that maximize the channel capacity.

According to an exemplary embodiment, in operation S620, the radio communication method may calculate a first channel capacity value of the channel capacity based on a first sensing duration value and a first false alarm probability value, and may calculate a second channel capacity value of the channel capacity based on a second sensing duration value and a second false alarm probability value. Where a difference between the first channel capacity value and the second channel capacity value is less than a predetermined threshold value, the radio communication method may determine the second sensing duration value and the second false alarm probability value as the sensing duration value and the false alarm probability value, respectively.

According to an exemplary embodiment, in operation S620, the radio communication method may calculate the sensing duration value and the false alarm probability value that maximize the channel capacity, according to the following process.

Initially, the radio communication method may set the first sensing duration value corresponding to an initial sensing duration value and the first false alarm probability value corresponding to an initial false alarm probability value. Assuming a worst-case scenario in sensing the radio channel, the radio communication method may calculate the first channel capacity value by using a largest sensing duration value as the first sensing duration value and by using a largest false alarm probability value as the first false alarm probability value in operation S620.

The radio communication method may calculate the first channel capacity value using the first sensing duration value and the first false alarm probability value.

Where the first sensing duration value is determined as the sensing duration, the radio communication method may calculate the second false alarm probability value. Where the second false alarm probability value is calculated, the radio communication method may determine the second false alarm probability value as the false alarm probability and then calculate the second sensing duration value.

The radio communication method may calculate the second channel capacity value using the second sensing duration value and the second false alarm probability value. Where a difference between the first channel capacity value and the second channel capacity value is less than a predetermined threshold value, the radio communication method may determine the second sensing duration value and the second false alarm probability value as the sensing duration value and the false alarm probability value that maximize the channel capacity.

Here, a process of determining another factor in a state where a single factor is determined may be performed using a simplified gradient scheme. The process may be performed by calculating a gradient of each of the factors with respect to the channel capacity.

In operation S630, the radio communication method may sense the radio channel using at least one of an energy detection scheme and a matched filter scheme.

According to an exemplary embodiment, in operation S630, the radio communication method may sense the radio channel using at least one of the energy detection scheme and the matched filter scheme. For example, in operation S630, the radio communication method may sense the radio channel using either the energy detection scheme or the matched filter scheme, and may also sense the radio channel using both the energy detection scheme and the matched filtering scheme. Where both the energy detection scheme and the matched filtering scheme are used, a detection performance of the radio channel may be enhanced whereas the sensing duration may be prolonged.

According to an exemplary embodiment, in operation S630, the radio communication method may sense the radio channel based on a cost function with respect to at least one of a sensing SNR, a throughput demand amount of the secondary user, a residual battery power of a radio communication apparatus of the secondary user, and a total battery power of the radio communication apparatus of the secondary user. In this case, the cost function to determine the channel detection scheme may be expressed by the above Equation 7.

As described above, according to an exemplary embodiment, in operation S610, the radio communication method may determine the channel capacity in various types of radio communication environments. In operation S620, the radio communication method may determine the sensing duration value and the false alarm probability value that maximize the channel. In operation S630, the radio communication method may sense the radio channel based on the determined sensing duration value and the false alarm probability value to thereby determine whether to transmit signals. Accordingly, the radio communication method may more effectively use the radio channel.

Exemplary radio communication method(s) described above may adopt, for example, the aforementioned configuration of the radio communication apparatus 100 of FIG. 1. Accordingly, further detailed descriptions related thereto will be omitted here.

The methods described above including a radio communication method may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A radio communication apparatus comprising:
   a channel capacity decision unit to determine a channel capacity of a radio channel based on a sensing duration to sense the radio channel and a false alarm probability;
   a parameter decision unit to determine a sensing duration value and a false alarm probability value that maximize the channel capacity; and
   a sensing unit to sense the radio channel based on the sensing duration value and the false alarm probability value.

2. The apparatus of claim 1, further comprising:
   a system environment information collecting unit to collect system environment information associated with a primary user system and a secondary user system with respect to the radio channel,
   wherein the channel capacity decision unit determines the channel capacity of the radio channel by further considering the system environment information.

3. The apparatus of claim 2, wherein the system environment information comprises at least one of a load amount of the primary user system, a load amount of the secondary user system, and a frequency interference amount in the radio channel.

4. The apparatus of claim 1, wherein:
   where a channel occupancy probability of a primary user with respect to the radio channel, corresponding to a primary activity factor, exists, the channel capacity decision unit determines, as the channel capacity of the radio channel, a sum of a primary user channel capacity and a secondary user channel capacity with respect to the radio channel, and
   the primary user channel capacity and the secondary user channel capacity are expressed by a function of the channel occupancy probability, the sensing duration, and the false alarm probability.

5. The apparatus of claim 1, wherein:
   where a channel occupancy probability of a primary user with respect to the radio channel, corresponding to a primary activity factor, does not exist, the channel capacity decision unit determines, as the channel capacity of the radio channel, a smaller value between a primary user channel capacity and a secondary user channel capacity with respect to the radio channel, and
   the primary user channel capacity and the secondary user channel capacity are expressed by a function of the sensing duration and the false alarm probability.

6. The apparatus of claim 1, wherein:
   the channel capacity decision unit determines, as the channel capacity of the radio channel, a secondary user channel capacity with respect to the radio channel, and
   the secondary user channel capacity is expressed by a function of the sensing duration and the false alarm probability.

7. The apparatus of claim 1, wherein:
   the parameter decision unit calculates a first channel capacity value of the channel capacity based on a first sensing duration value and a first false alarm probability value, and calculates a second channel capacity value of the channel capacity based on a second sensing duration value and a second false alarm probability value, and
   where a difference between the first channel capacity value and the second channel capacity value is less than a predetermined threshold value, the parameter decision unit determines the second sensing duration value and the second false alarm probability value as the sensing duration value and the false alarm probability value, respectively.

8. The apparatus of claim 1, wherein the sensing unit senses the radio channel using at least one of an energy detection scheme and a matched filter scheme.

9. The apparatus of claim 1, wherein the sensing unit senses the radio channel based on a cost function with respect to at least one of a sensing signal-to-noise ratio (SNR), a throughput demand amount of a secondary user, a residual battery power of a radio communication apparatus of the secondary user, and a total battery power of the radio communication apparatus of the secondary user.

10. A radio communication method comprising:
    determining a channel capacity of a radio channel based on a sensing duration for sensing the radio channel and a false alarm probability;
    determining a sensing duration value and a false alarm probability value that maximize the channel capacity; and
    sensing the radio channel based on the sensing duration value and the false alarm probability value.

11. The method of claim 10, further comprising:
    collecting system environment information associated with a primary user system and a secondary user system with respect to the radio channel,
    wherein the determining comprises determining the channel capacity of the radio channel by further considering the system environment information.

12. The method of claim 11, wherein the system environment information comprises at least one of a load amount of the primary user system, a load amount of the secondary user system, and a frequency interference amount in the radio channel.

13. The method of claim 10, wherein:
    where a channel occupancy probability of a primary user with respect to the radio channel, corresponding to a primary activity factor, exists, the determining comprises determining, as the channel capacity of the radio channel, a sum of a primary user channel capacity and a secondary user channel capacity with respect to the radio channel, and the primary user channel capacity and the secondary user channel capacity are expressed by a function of the channel occupancy probability, the sensing duration, and the false alarm probability.

14. The method of claim 10, wherein:

where a channel occupancy probability of a primary user with respect to the radio channel, corresponding to a primary activity factor, does not exist, the determining comprises determining, as the channel capacity of the radio channel, a smaller value between a primary user channel capacity and a secondary user channel capacity with respect to the radio channel, and the primary user channel capacity and the secondary user channel capacity are expressed by a function of the sensing duration and the false alarm probability.

15. The method of claim 10, wherein:

the determining comprises determining, as the channel capacity of the radio channel, a secondary user channel capacity with respect to the radio channel, and the secondary user channel capacity is expressed by a function of the sensing duration and the false alarm probability.

\* \* \* \* \*